(12) United States Patent
Leatham et al.

(10) Patent No.: US 9,816,055 B2
(45) Date of Patent: Nov. 14, 2017

(54) COMPOSITIONS, DEVICES, SYSTEMS AND METHODS RELATING TO PHOTO- AND THERMAL-OXIDATIVE BLEACHING OF PINK-STAINS

(71) Applicants: Scott Robert Leatham, Redmond, WA (US); Scott Anthony Laster, Redmond, WA (US); Heinz-Gunter Manfred Zieber, Kirkland, WA (US)

(72) Inventors: Scott Robert Leatham, Redmond, WA (US); Scott Anthony Laster, Redmond, WA (US); Heinz-Gunter Manfred Zieber, Kirkland, WA (US)

(73) Assignee: Gestalt Scientific Corporation, Redmond, WA (US)

( * ) Notice: Subject to any disclaimer, the term of this patent is extended or adjusted under 35 U.S.C. 154(b) by 14 days.

(21) Appl. No.: 15/080,445

(22) Filed: Mar. 24, 2016

(65) Prior Publication Data
US 2016/0281037 A1   Sep. 29, 2016

Related U.S. Application Data

(60) Provisional application No. 62/137,597, filed on Mar. 24, 2015, provisional application No. 62/196,867, (Continued)

(51) Int. Cl.
*C11D 3/395* (2006.01)
*A23L 5/49* (2016.01)
(Continued)

(52) U.S. Cl.
CPC .............. *C11D 3/3945* (2013.01); *A21D 2/20* (2013.01); *A21D 6/005* (2013.01); *A23L 5/49* (2016.08); *B08B 3/10* (2013.01); *B08B 7/0035* (2013.01); *C11D 3/2089* (2013.01); *C11D 3/39* (2013.01); *C11D 3/3942* (2013.01); *C11D 3/3955* (2013.01); *C11D 3/43* (2013.01);
(Continued)

(58) Field of Classification Search
None
See application file for complete search history.

(56) References Cited

U.S. PATENT DOCUMENTS

| | | | |
|---|---|---|---|
| 7,544,204 B2* | 6/2009 | Krespi | A61N 5/0603 128/898 |
| 2006/0047329 A1* | 3/2006 | Krespi | A61N 5/0603 607/86 |

(Continued)

FOREIGN PATENT DOCUMENTS

| | | |
|---|---|---|
| JP | 06287784 A | 10/1994 |
| JP | 2011240302 A | 12/2011 |
| JP | 2015171329 A | 10/2015 |

OTHER PUBLICATIONS

International Search Report and Written Opinion, PCT Application No. PCT/US2016/024102, dated Jun. 21, 2016, 14 pages.

*Primary Examiner* — Joseph D Anthony
(74) *Attorney, Agent, or Firm* — King IP Law; Joshua King

(57) ABSTRACT

Systems, methods, etc., directed to removing or modifying pink-stain in a substrate. For example, removal of pink-stains caused by *Streptoverticillium reticulum* in marine vinyl, or to enhance the speed, specificity, and efficacy of other bleaching processes of autofluorescent organic stains in those and other substrates.

48 Claims, 10 Drawing Sheets

Related U.S. Application Data filed on Jul. 24, 2015, provisional application No. 62/196,862, filed on Jul. 24, 2015.

(51) Int. Cl.

| | |
|---|---|
| *A21D 6/00* | (2006.01) |
| *A21D 2/20* | (2006.01) |
| *C11D 3/20* | (2006.01) |
| *B08B 3/10* | (2006.01) |
| *B08B 7/00* | (2006.01) |
| *C11D 3/39* | (2006.01) |
| *C11D 3/43* | (2006.01) |
| *C11D 11/00* | (2006.01) |
| *C11D 3/18* | (2006.01) |

(52) U.S. Cl.
CPC ....... *C11D 11/0017* (2013.01); *A23V 2002/00* (2013.01); *C11D 3/187* (2013.01); *C11D 11/007* (2013.01)

(56) References Cited

U.S. PATENT DOCUMENTS

| | | | | |
|---|---|---|---|---|
| 2007/0246064 | A1* | 10/2007 | Jackson | B08B 7/0021 134/1.2 |
| 2010/0076526 | A1* | 3/2010 | Krespi | A61N 5/0603 607/88 |
| 2012/0207858 | A1* | 8/2012 | Martin | A01N 59/00 424/661 |
| 2013/0192006 | A1* | 8/2013 | Tinker | C11D 3/042 8/137 |
| 2013/0310428 | A1* | 11/2013 | Joseph | A01N 43/38 514/365 |
| 2014/0196745 | A1* | 7/2014 | Whelan | B63B 59/04 134/1 |
| 2016/0281036 | A1* | 9/2016 | Laster | C11D 3/3945 |

\* cited by examiner

COMPOSITIONS, DEVICES, SYSTEMS AND METHODS RELATING TO PHOTO- AND THERMAL-OXIDATIVE BLEACHING OF PINK-STAINS

CROSS-REFERENCE TO RELATED APPLICATIONS

The present application claims the benefit of U.S. Provisional Patent Application Ser. No. 62/137,597, filed Mar. 24, 2015; U.S. provisional patent application No. 62/196,867, filed Jul. 24, 2015; and, U.S. provisional patent application No. 62/196,862, filed Jul. 24, 2015, which applications are incorporated herein by reference in their entirety.

BACKGROUND

A common issue in marine environments is a pink stain (pink-stain) apparently produced by *Streptoverticillium reticulum* as a byproduct of its metabolic processes, which stain appears to be comprised of an organic colorant. This organic colorant is soluble in polyvinylchloride (PVC) and other synthetic or natural materials. The *S. reticulum* stain (as well as other pink-stains comprising organic pigments or organic dyes created by microorganisms such as bacteria of the order Actinomycetales or the family Streptomycetaceae) appears on white marine vinyl and is a long-standing, prevailing problem in the pleasure and commercial boating industry for decades, well over 30 years. Accordingly, this is a long standing issue of great concern to vinyl manufacturers and users, as well as other manufacturers of other materials wherein such organic stains are problematic.

Thus, there has gone unmet a need for improved devices, systems, methods, etc., that remove such pink-stains. The present systems and methods, etc., provide these and/or other advantages.

SUMMARY

The systems, methods, etc., herein are directed to removing or modifying pink-stain in a substrate. For example, the systems, methods, etc., can be used to remove pink-stains caused by *Streptoverticillium reticulum* in marine vinyl, or to enhance the speed, specificity, and efficacy of other bleaching processes of other stains in other substrates.

Thus, one aspect of the systems, methods. etc., herein is to reduce and/or render invisible such stains in marine vinyl upholstery and other substrates, including the removal of pink colored stains in marine vinyl fabric caused by *S. reticulum* bacteria.

In further embodiments, the systems, methods. etc., herein can be used to reduce use of bleaching agents in flour and rice processing, or removal of pink-stain from other substrates in addition to marine vinyl/other vinyl upholstery. *S. reticulum* produces stains commonly found in flour and rice and similar products, and the systems and methods herein can be used in a manner similar to how they are used to reduce or eliminate staining on PVC to reduce or eliminate staining on the flour and rice. The systems, methods. etc., herein thereby reduce use of bleaching agents and thus significantly reduce contamination from and residue of the bleaching agents and chemicals used to remove the stains.

In one aspect, the methods, systems, etc., herein are directed to removing a pink-stain from a substrate, the method comprising:

a) identifying a pink-stain in a substrate The pink-stain can be produced from a microorganism;

b) applying a chemically effective amount of an oxidizing agent to the pink-stain and substrate;

c) applying a chemically effective amount of a treatment wavelength band of light to the pink-stain and substrate The treatment wavelength band of light matches an absorption wavelength band of the pink-stain and The treatment wavelength band of light can be at least about 31 $W/m^2$;

The treatment wavelength band of light can be applied to the pink-stain and substrate for a time sufficient to remove the pink-stain without substantially changing the color of the substrate.

In some embodiments, the methods can further comprise applying the chemically effective amount of the treatment wavelength band of light to eliminate the pink-stain from the substrate such that the pink-stain can be not visible to an unaided human eye at a surface layer of the substrate. The method can further comprise d) applying a chemically effective amount of heat to the pink-stain, The treatment wavelength band of light and heat can be applied to the pink-stain and substrate for a time sufficient to remove the pink-stain without substantially changing the color of the substrate, even to eliminating the pink-stain. In some embodiments, light applied to the pink-stain and substrate consists essentially of the treatment wavelength band of light and can be applied in a treatment wavelength band of light at about 50 W/m, 3,000/m, 15,500 W/m, at least about 5 $W/m^2/nm$.

The oxidizing agent can comprise at least one of a peroxide, benzoyl peroxide, ozone, a percarbonate, a perphosophate or hydrogen peroxide and can be about 25%, 15%, 11%, 10%, 8%, 5%, 3%, or 2% (w/w). The microorganisms include bacteria of Actinomycetales, Streptomycetaceae, or *Streptoverticillium reticulum*. The heat can be about 120° F., 140° F., 160° F., 180° F. or 200° F. The treatment can be applied to the pink-stain and substrate for less than about 120 minutes, 90 minutes, 60 minutes, 30 minutes, 15 minutes, 10 minutes or 5 minutes. The treatment wavelength band of light can be about 494 nm+/−5 nm applied to the pink-stain and substrate at an intensity wherein an area of about 25 in (0015 $m^2$) receives a luminous output of at least about 2 W from a 495 nm LED, at about 120° F. for about 30 to 55 minutes.

The methods can further comprise, before step b), selecting the amounts of the oxidizing agent and treatment wavelength band of light so to not exceed the operational parameters of the substrate such that steps b) and c) do not significantly alter characteristics of the substrate other than the removal of the pink-stain. The methods can also comprise, before step b), selecting the amounts of the oxidizing agent and treatment wavelength band of light so to not exceed the operational parameters of the substrate such that steps b) and c) do not significantly alter characteristics of the substrate other than elimination of the pink-stain such that the pink-stain can be not visible to an unaided human eye at a surface layer of the substrate. The methods can further comprise, before step b), selecting the amounts of the oxidizing agent, the treatment wavelength band of light and the heat so to not exceed the operational parameters of the substrate such that steps b), c) and d) do not significantly alter characteristics of the substrate other than the removal of the pink-stain. The methods can further comprise, before step b), selecting the amounts of the oxidizing agent, the treatment wavelength band of light and the heat so to not exceed the operational parameters of the substrate such that steps b), c) and d) do not significantly alter characteristics of the substrate other than elimination of the pink-stain such that the pink-stain can be not visible to an unaided human eye at a surface layer of the substrate.

The methods can further comprise using as a heat source for the heat at least one of a hot air blower or the light source emitting the treatment wavelength band of light. The methods can further comprise transmitting the treatment wavelength band of light through a housing configured to provide even light and/or heat distribution across a target area of the pink-stain and substrate. The substrate can comprise vinyl such as a marine vinyl, or can be rice or wheat flour or otherwise as desired.

The treatment wavelength band of light consists essentially of light from about 470 nm to 525 nm; from about 480 nm to 510 nm; from about 490 nm to 500 nm, or can consist essentially of light at about 494 nm+/−5 nm.

The methods can further comprise, before step b), identifying an absorption wavelength band of light of the pink-stain and selecting the treatment wavelength band of light to match the absorption treatment wavelength band of light.

The oxidizing agent can be carried in a solvent having a polarity of about 2 to 3, a viscosity of about 3 cP to 0 cP, and a vapor pressure of 15 to 250 mm Hg, such that a coating of the solvent applied to a marine vinyl fabric with a fine brush will fully evaporate within about 10 seconds at a temperature of 20° C. The solvent can have a viscosity of about 7 cP to 9 cP, or about 8 cP. The solvent can comprise a benzene ring, xylene, toluene or methyl ethyl ketone (MEK).

The aspects and embodiments herein also include treating autofluorescent organic stains of microorganism origin, as well as systems and kits configured to implement the methods herein, and methods of making such systems.

These and other aspects, features and embodiments are set forth within this application, including the following Detailed Description and attached drawings. Unless expressly stated otherwise, all embodiments, aspects, features, etc., can be mixed and matched, combined and permuted in any desired manner. In addition, various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application.

DETAILED DESCRIPTION

The systems, methods. etc., herein improve pink-stain removal from a substrate using strong oxidizing agents such as peroxides, or organic or oxygen radicals, such as benzoyl peroxide, ozone, hypochlorite (bleach), percarbonates, perphosophates or hydrogen peroxide.

Figure 1A:
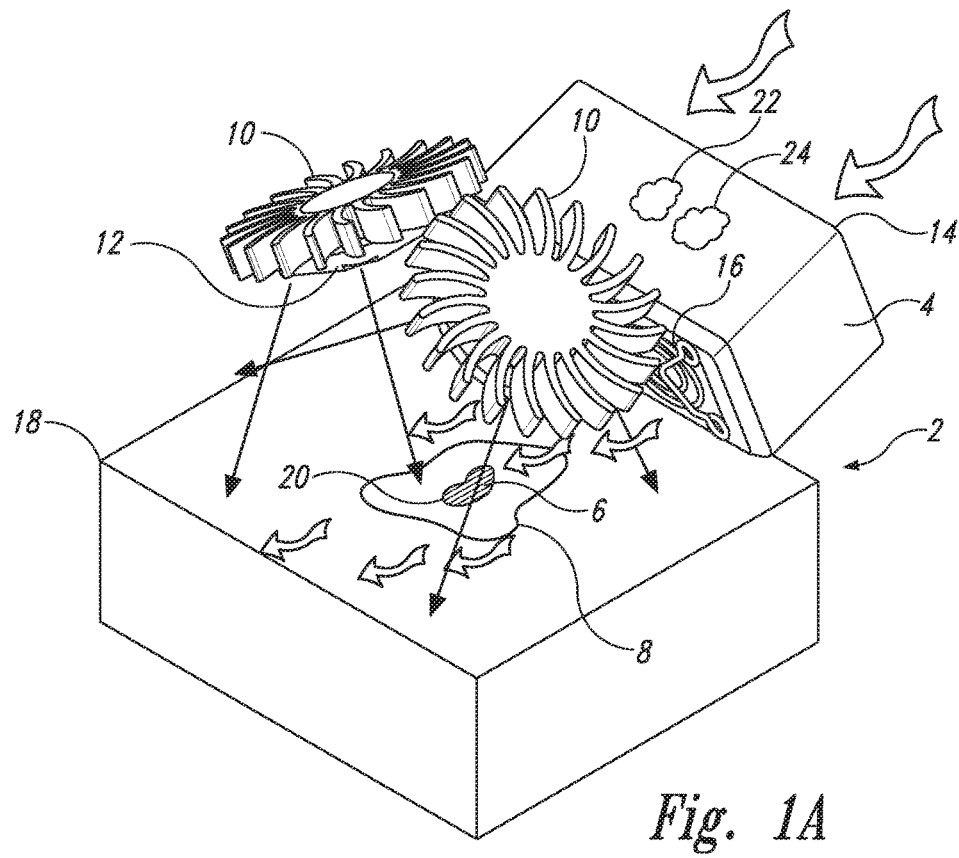
FIG. 1A depicts a schematic perspective view of a system as discussed herein configured to remove organic stains from a substrate.
Figure 1B:
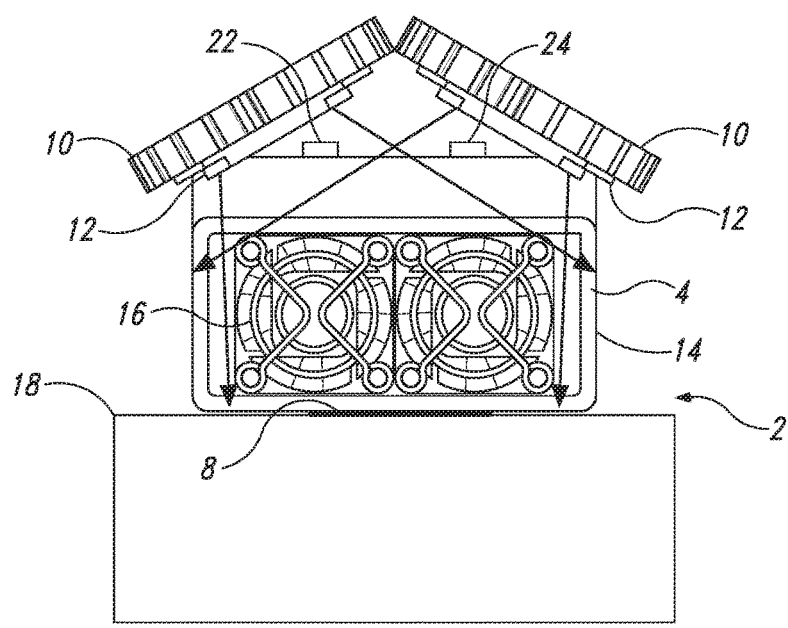
FIG. 1B depicts a schematic side view of a system as discussed herein configured to remove organic stains from a substrate.

Briefly discussing some exemplary systems suitable for removing pink-stain, or other autofluorescent stains produced by microorganisms as discussed herein (i.e., fluorescence arising from internal fluorophores as opposed to added, external fluorophores), as depicted in FIGS. 1A and 1B, systems 2 can comprise a housing 4 configured to provide light and heat distribution across the target area 6 of the stained substrate 8 and to provide safe handling by a user. The system 2 comprises a light source 10 comprising a light diffuser 12 and a heat source 14 comprising a heat diffuser 16.

The light source 10 is configured to emit a treatment and/or excitation wavelength band of light onto the organic autofluorescent stain 20 and substrate 8, wherein the wavelength band matches an absorption wavelength band and/or excitation wavelength band of the organic autofluorescent stain. The diffusers provide even light and heat distribution across the stained substrate 8. The system 2 can also comprise a platform 18 configured to hold the stained substrate 8 during treatment. The platform 18 can also be a heat sink which can remove unwanted heat and/or assist the even distribution of heat across the stained substrate 8.

The system 2 is configured to emit the treatment or excitation wavelength band of light onto the organic autofluorescent stain 20 and substrate 8 for a time sufficient to remove the organic autofluorescent stain without substantially changing the color of the substrate.

The system 2 can also comprise heat controls 24 and light controls 26 to facilitate safety and to manage temperature and light exposure, respectively In some embodiments, the system 2 is configured to be moved across a substrate in situ, i.e., in the location where the substrate naturally exists. For example, if the stained substrate is marine vinyl, the system can be used to treat the vinyl and remove the autofluorescent organic stain without removing the vinyl from the boat it is in, or if the stained substrate is a couch cushion, then the system can be used to treat the cushion without removing it from the couch.

In one aspect, the current systems, methods. etc., herein comprise administering to a stained substrate such as PVC until the stain is significantly reduced or rendered invisible:
a) A chemically effective amount of a peroxide such as benzoyl peroxide to the pink-stain, and
b) About 31 to 50 $W/m^2$ up to 15,500 $W/m^2$ (0.02-0.03 $W/in^2$ to 10 $W/in^2$) of a treatment wavelength band of light wherein the treatment wavelength band of light is similar to (i.e., matches) the absorption spectrum of the colorant property of the pink-stain, until the colorant property of the pink-stain is substantially changed, and
c) A chemically effective amount of heat to the pink-stain to increase the speed of change of the colorant property of the pink-stain.

Pink-stain autofluoresces when excited by excitation light in or about the absorption wavelength band of light, which can be, for example about 470 nm to 525 nm; 480 nm to 510 nm; 490 nm to 500 nm or 494 nm+/−5 nm.

Turning to a further discussion of the current systems, methods. etc., herein such systems, etc., can comprise an excitation light source configured and sized to cause autofluorescence the stain; causing such autofluorescence appears to cause and/or enhance stain removal and/or elimination. Such systems can include an excitation light source configured and sized to emit light in the range of 490 nm to 540 nm and powerful enough to cause such autofluorescence, and typically to emit substantially only light at or below about 500 nm, or at least substantially only light have a wavelength shorter than the wavelength of the fluorescent light emitted by the stain such as an *S. reticulum* stain, which is emission light is above about 600 nm. The selective emission light can be generated, for example, using a selective-light emission source such as an LED that emits light in the excitation range, or by electively emitting only the desired light from a broad band light source such as a white light source.

Other autofluorescent organic stains also autofluoresce when excited by appropriate wavelengths of light, for example those above and those in the range of UV, 440 to 450 nm, or 490 nm to 540 nm, as well as other excitation wavelengths applied powerfully enough to cause such autofluorescence. In certain embodiments, the excitation light consists essentially of only the excitation wavelength band of light.

In certain embodiments that include autofluorescent organic stains in addition to pink-stain, the chemical effectiveness of the light in the absorption band of the stain has a sharp peak, dropping off in both directions from a central maximum. In such cases, the treatment wavelength band of light is a truncated treatment wavelength band of light quantified by its central wavelength, quality factor, flux, and spectral intensity. The quality factor is defined as the central wavelength divided by its full width at half maximum, and narrow band light is defined as having a quality factor of at least 4. In certain embodiments the quality factor is about 5, 10, 15, 19, 20 or 25 or more.

The truncated treatment wavelength band of light's maximum spectral intensity can be calculated by dividing its flux by the full width at half maximum. In some embodiments, such as for pink-stain, a truncated treatment wavelength band of light has a central wavelength of 493 nm with FWHM of 26 nm, a quality factor of 19.1, a flux of 3,000/$m^2$, and a calculated maximum spectral intensity of about 600 $W/m^2/nm$. Some stains have narrow chemically effective absorption spectra. Matching narrow band light sources can be used and can be advantageous, for example because such can have greater power efficiencies in promoting stain elimination with oxidizers, gaining a ratio of effectiveness as large as their quality factors in some cases. Also, since substrates have maximum effective illumination and/or temperature ranges, substrates typically should not be heated or illuminated to the point that the substrate is significantly damaged. Thus, a given maximum flux can be constrained by balancing the rate of energy deposition, and if so then the rate of cleaning can be approximately the quality factor faster than a wide band lighting source of the same power density.

Microorganisms including fungi, algae, and bacteria produce many autofluorescent organic stains.

Suitable spectral intensities for the methods, systems, etc., herein be at least about 5 $W/m^2/nm$, 40 $W/m^2/nm$, 150 $W/m^2/nm$, 600 $W/m^2/nm$, 800 $W/m^2/nm$, 1000 $W/m^2/nm$ or 1500 $W/m^2/nm$.

In certain embodiments, the oxidizer, such as benzoyl peroxide, the treatment wavelength light band(s) and heat are applied such that the stain is rendered colorless in less than about 5 hours, 3 hours, 2 hours, 90 minutes, 60 minutes, 30 minutes, 15 minutes, 10 minutes or 5 minutes.

As noted above, in some embodiments, the stain is a colorant, a pigment or dye, produced by *S. reticulum* or other microorganisms producing autofluorescent organic stains.

In a further aspect, the current systems, methods. etc., herein comprise administering the treatment wavelength band of light herein to a substrate pink-stained by *S. reticulum* until the stain is significantly removed or eliminated. One example of the methods comprises applying to the stain for up to at least about 30 min, or even less:
a) light from a light source wherein the light has a treatment wavelength band of light of 494 nm+/−5 nm is projected per 2.25 $in^2$ (0.0015 $m^2$) of a stained substrate at about 120° F. for about 30 to 55 minutes. The light source can be a 10 W 495 nm Cyan light emitting diode ("LED"; as per manufacturer's label) drawing 7.7 Watts.

In embodiments for certain colors such as complex color stains (such as brown) multiple treatment wavelength bands of light may be used.

In certain embodiments, the oxidizer, such as benzoyl peroxide, the treatment wavelength light band(s) and heat are applied such that the stain is rendered colorless in less than about 120 minutes, less than about 90 minutes, less than about 60 minutes, less than about 30 minutes, or less than about 15 minutes. The light band(s) can be present with other light wavelengths provided that such additional wavelengths do not harm the substrate and provided that the selected treatment wavelength band(s) of light are applied in the required strength (dosage).

In some embodiments, the amounts of the peroxide/oxidizers, light and heat are selected so to not exceed the operational parameters of the base substrate material containing the organic pigment or organic dye to be changed. In other words, the parameters, particularly the heat and light parameters, should be chosen such that the parameters do not destroy the underlying substrate material such as PVC, and further chosen such that the parameters do not significantly alter or harm the characteristics of the underlying substrate material such as PVC other than the removal of the stain and further should be chosen such that the parameters do remove or eliminate the organic stain not to alter the color of the stain but leave it in the substrate. For example, if pink-stained marine vinyl is heated to more than about 160° F. or 180° F. in certain embodiments, the treatment may render such pink-stain to change to gray instead of disappear. Thus, the parameters are typically chosen such that the stain attenuation or elimination does not harm the PVC or other stained substrate nor to cause the stain's color to change to a different color that leaves a differently colored stain, for example causing the pink-stain associated with *S. reticulum* to become a grayish stain. For another example, heating pink-stain in marine vinyl to 270° F./131° C. with pressurized steam for roughly 15 minutes left a gray stain and warped and shrunken vinyl.

Turning to a further discussion of some of the systems, methods. etc., herein, the systems and methods include a chemical oxidizer (peroxide, percarbonate, perphosphate for example), and a light source producing an intense narrow band of treatment light (suitable light sources include for example LEDs, lasers, fluorescent, incandescent, metal vapor, and photochemical light sources), and a heat/temperature source providing heating and/or cooling depending on the goal (for example, if the light source is producing too much heat and thus may adversely affect the substrate, a cooling system may be advantageous). Heat sources include for example hot air blowers or the light source itself, where one can for example reuse waste heat from the lighting system.

In some embodiments, the amount of heat, the oxidizer and the spectrum and intensity of the treatment light impinging on the target area can be varied to accommodate the substrate material, the type of autofluorescent organic stain, the color of autofluorescent organic stain, the usage environment and the ambient conditions. For example, to completely remove stains in a white marine vinyl fabric having a 100% saturation of *S. Reticulum* pink colored organic stains from front to back of the thickness of the fabric or other substrate, the stained vinyl fabric was heated to 140° F., the surface was coated with solution of 12.5% benzoyl peroxide (w/w) and the treated fabric is exposed to a narrow band of cyan light in the 490 nm to 495 nm range produced by a 10 Watt LED (as per manufacturer's label) array (7.7 W emitted) for 30 minutes. This completely removes the stain to the unaided human eye. Cross-section analysis revealed that approximately 3% to 20% stain penetration from the outer surface faded enough to no longer be visible to the naked eye at the surface layer. Examination using a 300× digital microscope revealed no surface damage to the substrate.

Other parameters include, for example, BPO at 7.5%, 8%, 10%, 12% or 12.5% in an aqueous solution or suspension, on in or organic solvent. Light sources can include, for example, LEDs/LED arrays having an output of 3 W, 10 W, 50 W 90 W, 100 W, 200 W, or 400 W.

The design of the light and heat source can be adapted to suit the shape and size of the material or object containing the stains. The design can be optimized to simplify the method of handling the apparatus and an integrated or separate apparatus can be designed to distribute the chemicals used in the process. The type of heat produced (hot air, infrared) and chemical composition of the oxidizer may be altered within certain constraints as to not overheat or occlude the base material.

Turning to a further discussion of the current compositions, methods, etc., herein, in some embodiments such compositions comprise a solvent that is characterized, for example, by being an organic solvent having a polarity of about 2 to 3, typically about 2.5; a viscosity of about 0.2 cP or 0.3 cP to 1.0 cP or 1.5 cP, or about 0.7 cP to 0.9 cP, or about 0.8 cP; and a vapor pressure of 15 to 250 mm Hg, such that a coating of the solvent applied to a marine vinyl fabric with a fine brush will fully evaporate within about 10 seconds at an ambient temperature of 20° C.; such a solvent may have a benzene ring, such as xylene, in combination with BPO or other suitable oxidizer.

The compositions, etc., herein comprise in one example a solution of BPO, a chemically active ingredient, in xylene, the solvent. BPO is stable when dissolved in xylene; a solution of 10% BPO by weight can be achieved at standard conditions (per National Institute of Standards and Technology (NIST), standard conditions are 20° Celsius and 101, 325 Pa (1 atm)). This combination of xylene and BPO results in stability of the BPO, absence of damage to substrates that may contain *S. reticulum* stain such as PVC, absence of significant damage to vinyl finish, and low viscosity. Significant damage to vinyl fabric as the result of stain removal treatment to the treated area includes, for example, discoloration detectable by the human eye, removal of water proofing, accelerated aging, reduction in shear or tear strength, physical deformation, increased Shore Durometer hardness (durometer is one of several measures of the hardness of a material. Hardness can be defined as a material's resistance to permanent indentation as defined by Rockwell Corporation Shore Durometer calibrated measuring devices. ASTM D2240. Standard Test Method for Rubber Property), reduced ASTM D2240 elastic modulus, or changing how the treated fabric feels to the touch.

Suitable xylene or other suitable organic solvent concentrations can be about 75%, 80%, 85%, 90%, 95% or 97% (w/w).

The current solutions, compositions, methods, etc., can also remove pink-stain and other autofluorescent organic stains at depth in a substrate such as marine vinyl. For example, in some embodiments, the pink-stain can be removed not just from the visible surface but also as much as about 0.1 mm, 0.2 mm, 0.3 mm, 0.4 mm, 0.5 mm, 0.6 mm, 07 mm, 0.8 mm, 0.9 mm, 1.0 mm or 1.1 mm deep, or more, in an affected area of vinyl upholstery. Thus, for a 1.1 mm, 1.2 mm, 1.5, mm, etc., thick piece of upholstery, the compositions, methods, etc., herein can remove pink-stain all the way through the upholstery. Substrates herein can also include rice, wheat flour, etc.

Significant economic value can be realized with predictable, complete eradication of pinking on boat vinyl fabric. Eradication of stains via these methods represent a significant reduction in cost and time when compared to replacing stain-damaged vinyl fabric.

The solvent compositions, etc., herein can improve both efficacy and time needed to complete successful treatment, for example compared to delivering BPO to vinyl fabric using an aquatic suspension of BPO particulates for superficial application. The compositions, etc., herein can improve upon the aquatic suspension method by dissolving BPO into xylene to provide a composition with low polarity and low viscosity so that it can enter small cracks and fissures in the surface of fabric easily, and sufficiently low vapor pressure so that it will evaporate rapidly once it has been applied to a stain under standard conditions (e.g., the composition will penetrate the vinyl and dry in less than about 20 seconds, 10 seconds, or 5 seconds, at 20° C. at 1 atmospheric pressure at sea level).

Significant amounts of BPO can go into solution in xylene, for example about 2% BPO, 3% BPO, 5% BPO, 8% BPO, 10% BPO, 11% BPO, or 12% BPO by weight, and thus for an 11% BPO solution, about 0.05 milliliters of solution containing 730 micrograms of BPO per square inch of vinyl fabric. This combination of properties allows for a deeper and much more rapid delivery of BPO into the vinyl for pink-stain treatment compared to aqueous suspensions. With BPO dissolved in Xylene, the properties of the solvent are preserved, such as 2.5 polarity, 0.8 cP viscosity and 18 mmHg vapor pressure. Other exemplary organic solvents include toluene, methyl ethyl ketone and benzene.

In one embodiment for use of the compositions herein, the treatment of pink-stains, the solution was applied with a fine painter's brush or felt pen. The solution penetrates cracks and fissures of the vinyl fabric and carried amounts of BPO with it that were sufficient for complete pink-stain eradication. The low vapor pressure of xylene means that it will evaporate quickly. As it evaporates, BPO comes out of solution as very fine crystals. Such fine crystals, having large surface area for their volume, will readily penetrate into the vinyl fabric everywhere the xylene or other suitable solvent carries them. In other words, BPO was carried into vinyl fabric everywhere the solvent was able to reach.

In some other embodiments, the compositions comprise other solvents able to dissolve benzoyl peroxide. Exemplary properties of suitable solvents include the following:

Dissolves benzoyl peroxide to form a solution of benzoyl peroxide adequate to treat the pink-stain, for example about 8% to 12% BPO by weight.

Forms a stable solution that does not substantially degrade BPO, is free from secondary reactions such as the formation of explosive peroxides, and maintains those qualities for a minimum of six months when stored at temperatures less than 113 degrees F.

The solution has low viscosity to enter fissures and cracks in vinyl fabric.

The dried solution's residue does not auto ignite at or below 160° F. in air.

The solution does not alter or otherwise damage the vinyl fabric.

The solution does not alter or damage any non-vinyl coating on the fabric, such as acrylic coatings.

The solution, once applied, will evaporate within seconds.

The solvent having a polarity of about 2.5; a viscosity of 0.8 cP or less.

The solvent having a vapor pressure of 15 to 250 mm Hg.

The solvent may have a benzene ring in chemical composition.

Some exemplary alternate solvents include toluene and methyl ethyl ketone (MEK).

Further embodiments for forming a solution of benzoyl peroxide in a suitable solvent include:

Use of solvent other than xylene

Direct formation of desired concentration of benzoyl peroxide in solution using sufficiently pure ingredients to eliminate the filtration step.

Agents to increase viscosity such as Carbomer copolymers type 940 and Homopolymer type A, B, or C.

Agents to control odor

Other compositions include colloidal suspensions of BPO (or other oxidizer) dissolved in a solvent mixed in an immiscible carrier, or colloidal suspensions of solid BPO in a suitable carrier.

An exemplary protocol comprises:
1. Provide a *S. reticulum* pink-stained piece of fabric.
2. If desired, perform a fluoroscopic analysis of the stained fabric such as vinyl; take still picture if desired for later comparison.
3. Apply BPO in xylene solution with painter's brush to the stained fabric.
4. Let dry about 15 seconds.
5. Apply light and heat to illuminate at 492 nm with 2 W/square inch at a surface temperature of 150° F. Apply for 10 minutes.
6. Repeat steps 2 to 4 one to three times (i.e., reapply the BPO-xylene solution and light/heat two times), typically two times, as needed to eliminate the pink-stain visible to the human eye.
7. If desired, perform a further analysis capable of determining the presence of the pink-stain below the surface of the fabric, for example a fluoroscopic analysis. If desired, take still picture to document the status and/or elimination of the pink-stain.

EXAMPLES

Example 1

Elimination of Pink Organic Stains from Bacteria *S. Reticulum* at Room Temperature This example focuses on using a Cyan LED light source to remove Pink Organic Stains from bacteria *S. reticulum* at a low room temperature.

Duration: Approx. 4.5 hours actual exposure/application of treatment wavelength band of light to the sample of pink-stain.

Temperature: Approx. 40° F. ambient, no added heat

LED light source: Cyan 490 nm-495 nm, Peak at 494 nm

Input wattage: 7.7 W; output 1.9 W

Oxidizer: 12.5% (w/w) nano-encapsulated Benzoyl Peroxide.

FIGS. 2A to 7B depict the procedures in this Example.

Figure 2A:
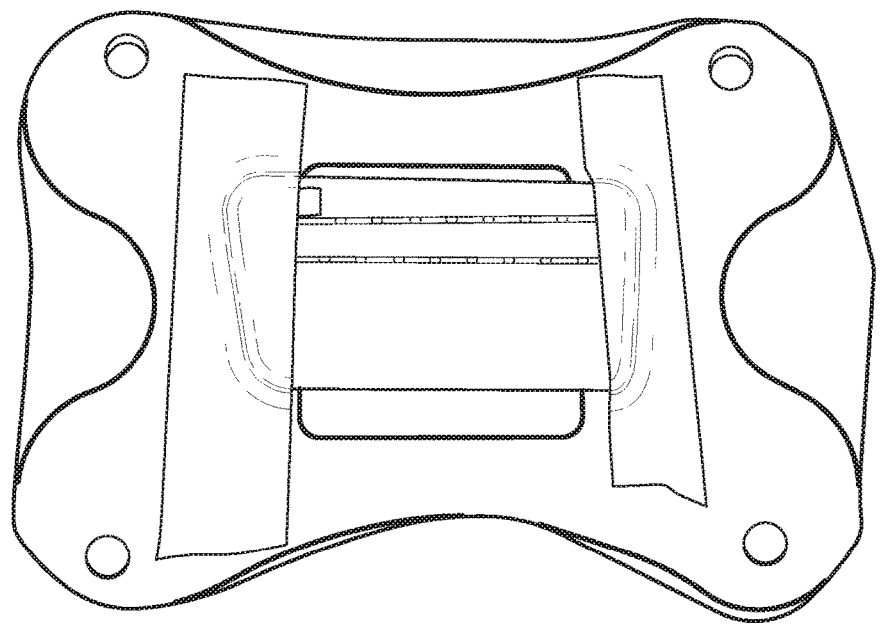
FIG. 2A depicts a "before" photograph depicting a sample of pink-stain on marine vinyl placed in test jig before treatment.

FIG. 2A depicts a "before" photograph depicting the sample of pink-stain on marine vinyl placed in test jig before treatment.

Figure 2B:
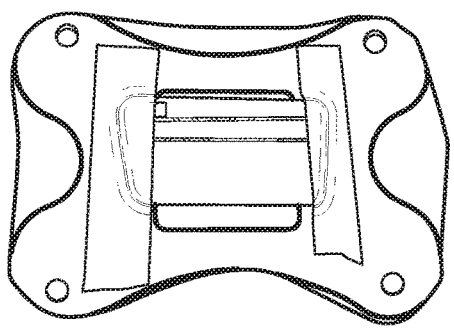
FIG. 2B depicts an enhanced contrast version of the "before" sample of FIG. 2A.

FIG. 2B depicts an enhanced contrast version of the "before" photograph of FIG. 2A.

Figure 3A:
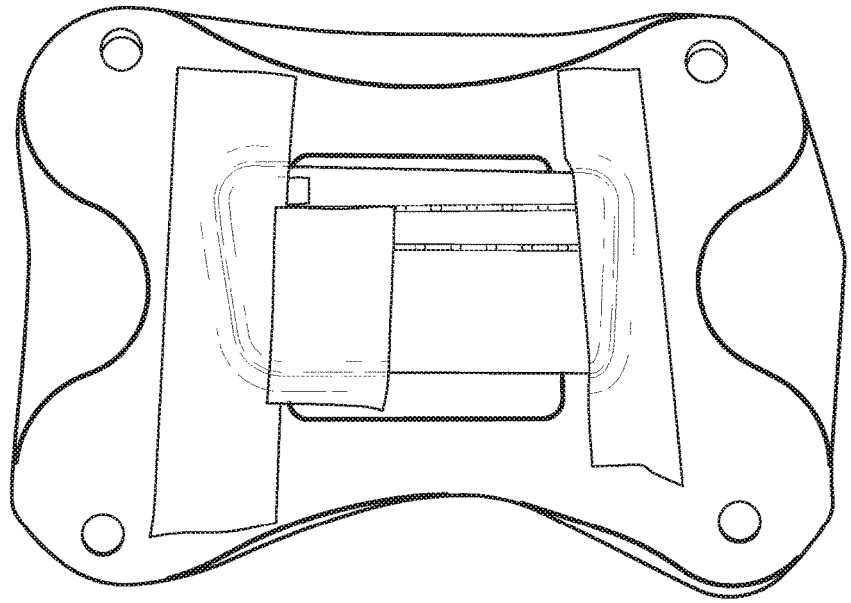
FIG. 3A depicts the sample of FIG. 2A treated with benzoyl peroxide (BPO) solution.

FIG. 3A depicts the sample of FIG. 2A after having been treated with the 12.5% (w/w) benzoyl peroxide (BPO) solution by painting on the BPO composition with a brush to coat the target area for a duration of about 1 hour under normal room lighting. As can be seen, this did not reduce the amount of stain.

Figure 3B:
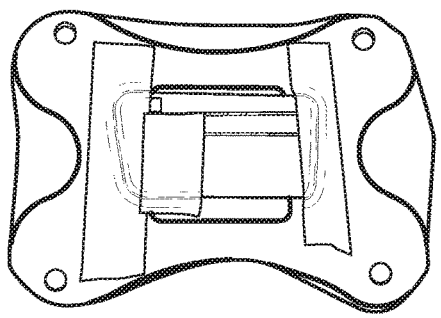
FIG. 3B depicts an enhanced contrast version of the photograph of FIG. 3A.

FIG. 3B depicts an enhanced contrast version of the photograph of FIG. 3A.

Figure 4:
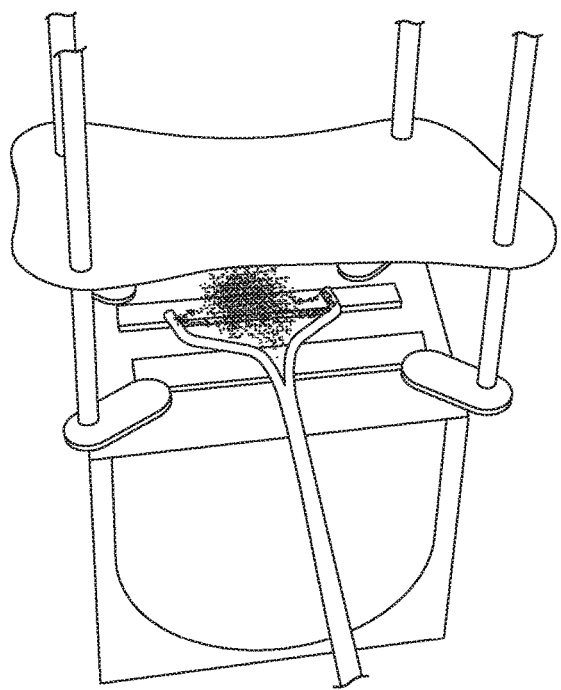
FIG. 4 depicts the sample of FIG. 2A being exposed to a treatment wavelength band of light.

FIG. 4 depicts the sample of FIG. 2A being exposed to a treatment wavelength band of light, 490 nm-495 nm, peak at 494 nm, from a cyan LED light source. Note that the left side of the sample is masked and therefore untreated for later comparison purposes.

Figure 5:
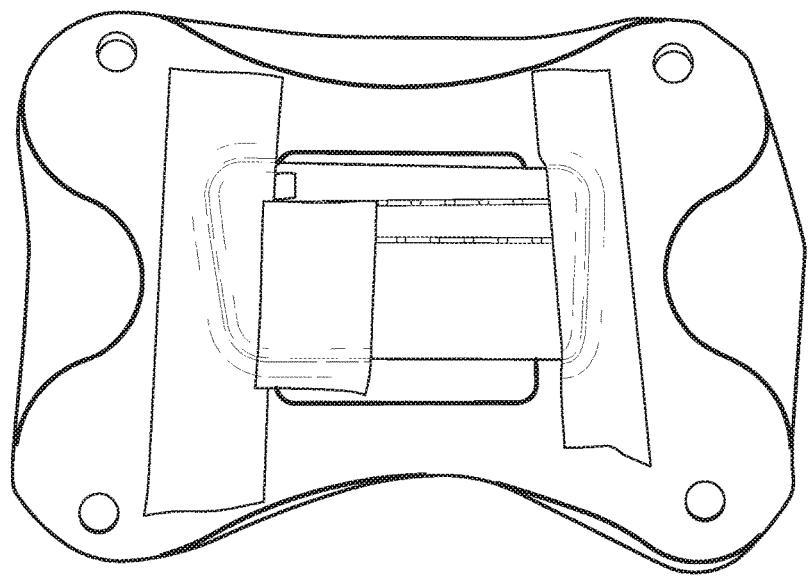
FIG. 5 depicts the sample of FIG. 2A 16 minutes after exposure began; new BPO solution was applied.

FIG. 5 depicts the sample of FIG. 2A after 16 minutes of treatment. Fresh new BPO solution was applied.

Figure 6A:
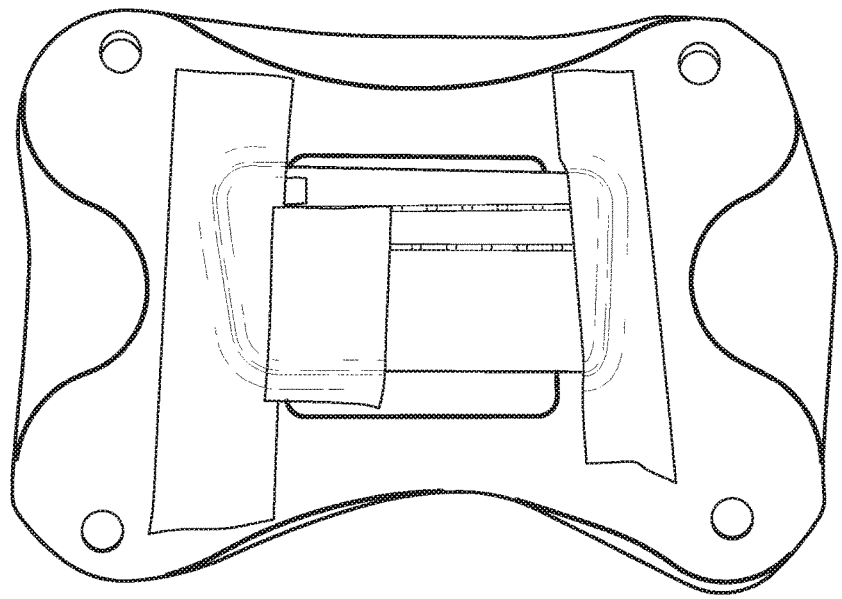
FIG. 6A depicts the sample of FIG. 2A after 3 more hours of continuous exposure; the organic stains are barely visible in the treatment area.

FIG. 6A depicts the sample of FIG. 2A after about 3 more hours of exposure. The organic stain has been removed and is barely visible in the treatment area.

Figure 6B:
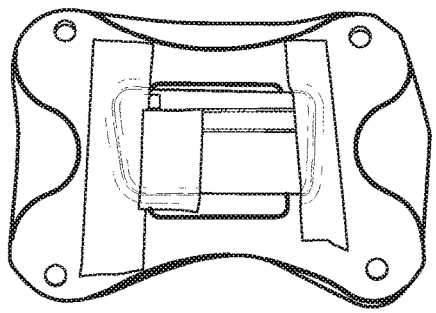
FIG. 6B depicts an enhanced contrast version of the photograph of FIG. 6A.

FIG. 6B depicts an enhanced contrast version of the photograph of FIG. 6A.

Figure 7A:
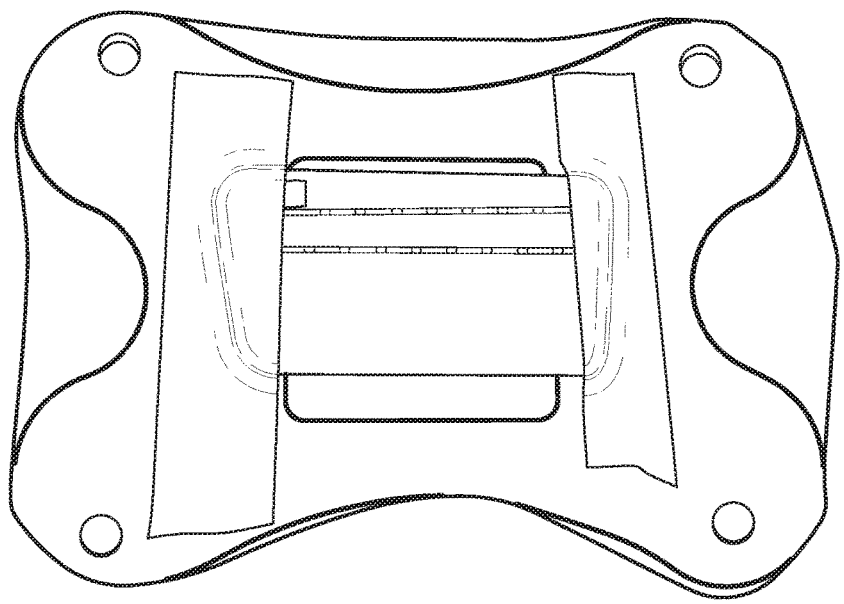
FIG. 7A depicts a comparison of left (untreated) and right (treated) sides of the sample of FIG. 2A; the stain has been eliminated from the treatment side.

FIG. 7A depicts the sample of FIG. 6A, except that the mask on the left side of the sample has been removed to provide a comparison of left (untreated) and right (treated) sides of the sample of FIG. 2A; the stain has been eliminated from the treatment side.

Figure 7B:
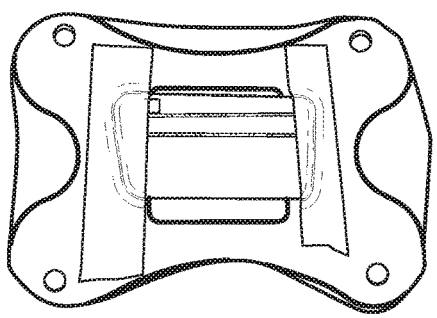
FIG. 7B depicts an enhanced contrast version of the photograph of FIG. 7A.

FIG. 7B depicts an enhanced contrast version of the photograph of FIG. 7A.

Example 2

Elimination of Pink Organic Stains from Bacteria *S. Reticulum* with Increased Temperature This example focuses on a using Cyan LED light source and heat to remove Pink Organic Stains from bacteria at a low room temperature.

Duration: Approx. 0.5 hours actual exposure/application of treatment wavelength band of light to the sample of pink-stain.
Temperature: Approx. 147° F. ambient, heat provided by a hot air blower.
LED light source: Cyan 490 nm-495 nm, Peak at 494 nm.
Input wattage: 7.7 W, luminous radiant energy of 2 W.
Oxidizer: 12.5% (w/w) nano-encapsulated Benzoyl Peroxide.

For comparison purposes, the sample was masked then strips of the sample were sequentially exposed to the treatment wavelength band of light and heat at 5 minute increments.

Figure 8:
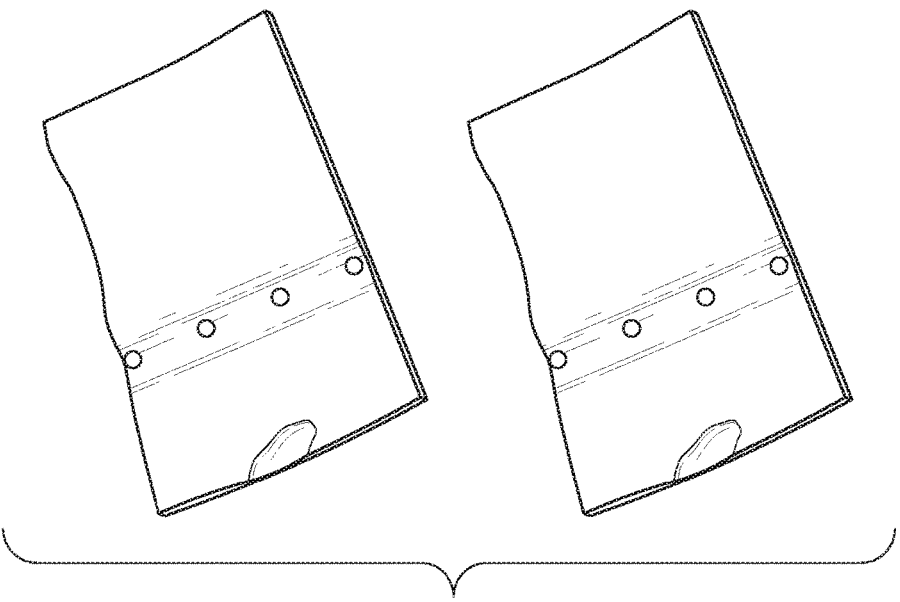
FIG. 8 depicts a "before" photograph depicting a second sample of pink-stain on marine vinyl before treatment; the left panel depicts standard contrast, the right panel an enhanced contrast version of the same photograph.

FIG. 8 depicts a "before" photograph depicting a second sample of pink-stain on marine vinyl before treatment. The left panel has standard contrast, while the right panel is an enhanced contrast version of the same photograph.

Figure 9:
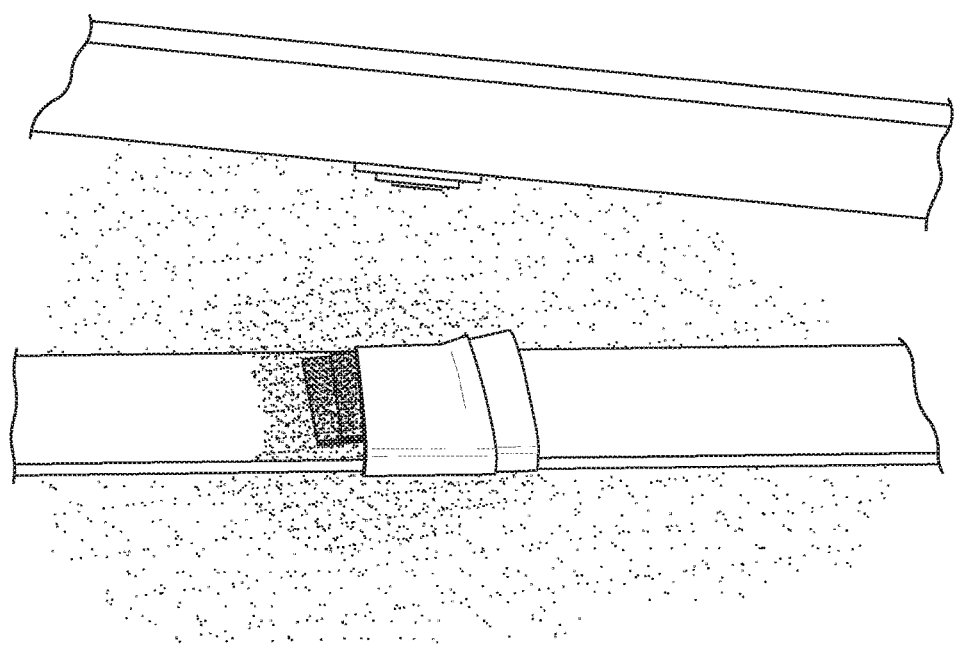
FIG. 9 depicts a photograph of the sample from FIG. 9 after ten minutes of treatment; the sample has been placed in a jig such that two strips of the sample are being treated; additional strips of sample were exposed at 5 minute increments.

FIG. 9 depicts a photograph of the sample from FIG. 9 after ten minutes of treatment with a treatment wavelength band of light, 490 nm-495 nm, peak at 494 nm, from a cyan LED light source, and heat provided from a hot air blower. In FIG. 9, the sample has been placed in a jig such that two strips of the sample were being treated. Additional strips of sample were exposed at 5 minute increments.

Figure 10:
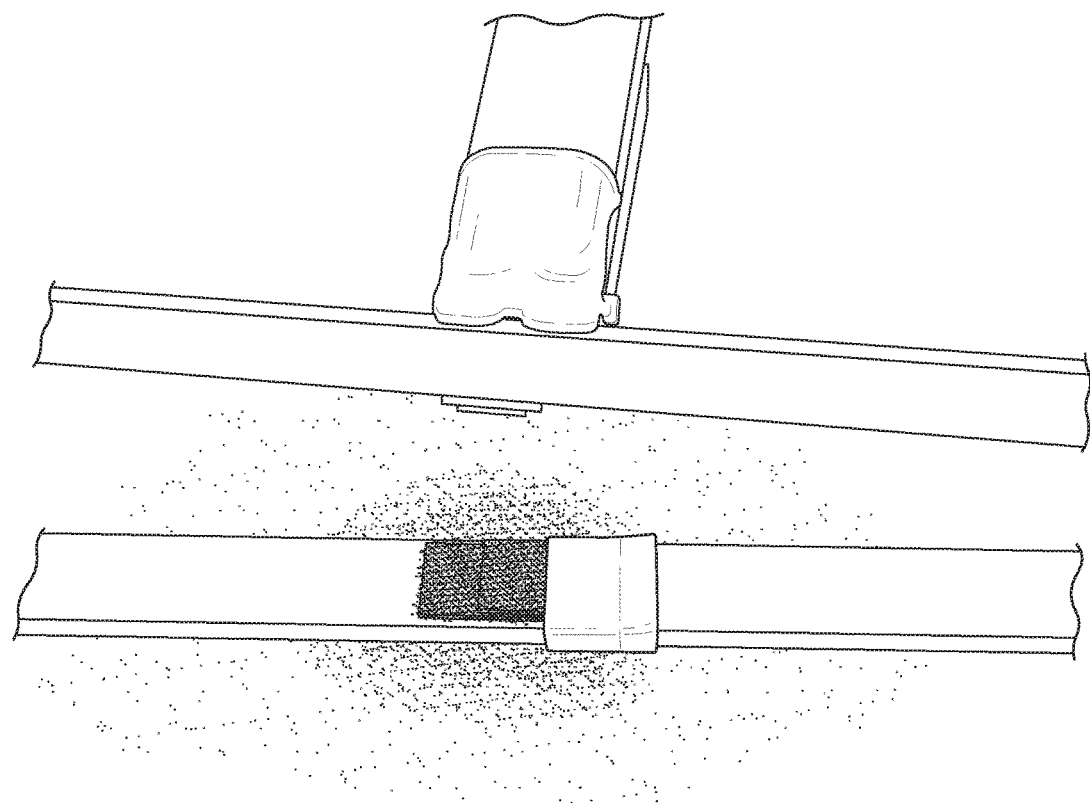
FIG. 10 depicts a photograph of the sample from FIG. 9 after twenty minutes of treatment with two further strips of the sample being treated.

FIG. 10 depicts a photograph of the sample from FIG. 9 after twenty minutes of treatment with two further strips of the sample being treated.

Figure 11:
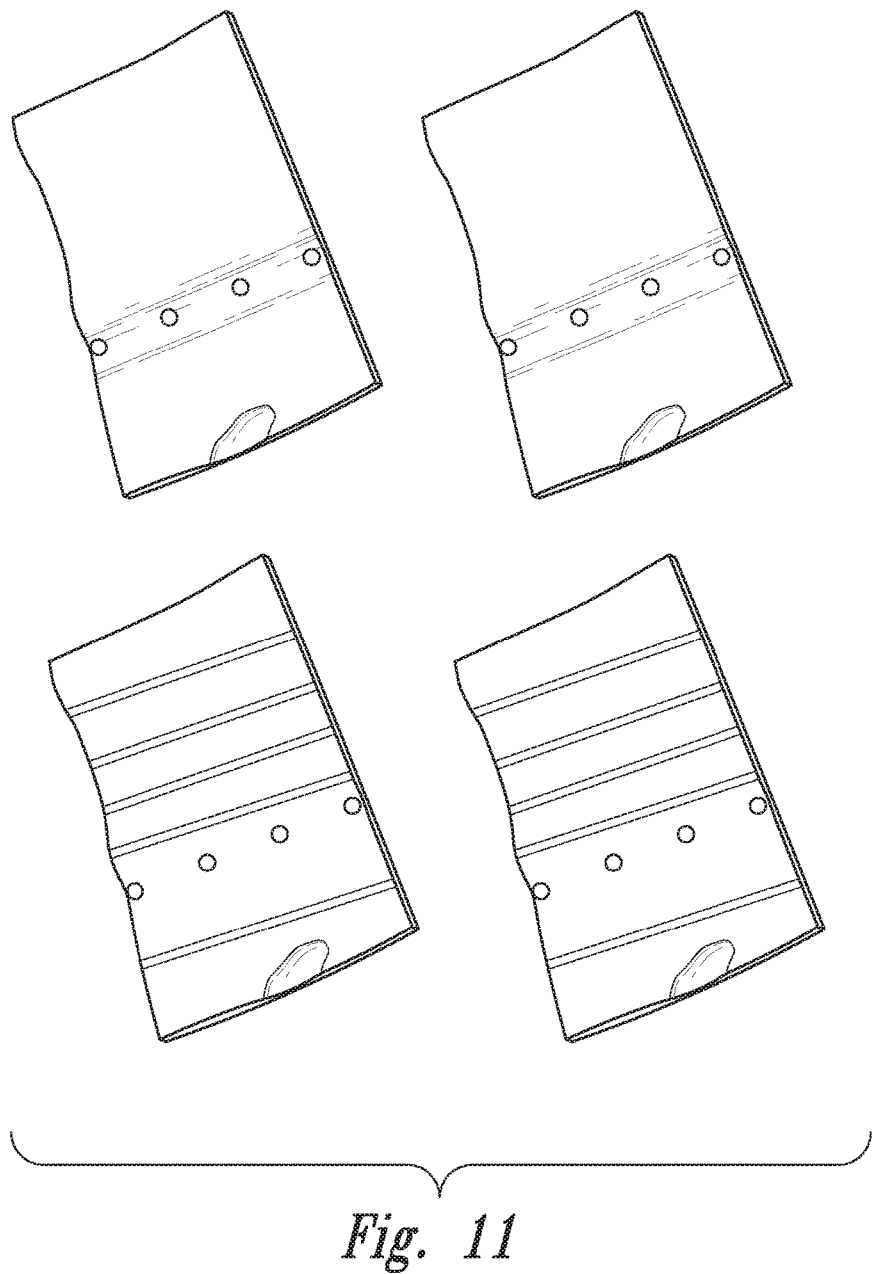
FIG. 11 depicts a "before" and "after" photograph of the sample from FIG. 9; the upper images are the "before" photographs shown in FIG. 9 and the lower images are "after" of the sample; the right image of each upper/lower pair is an enhanced contrast version of the left image in the pair.

FIG. 11 depicts a "before" and "after" photograph of the sample from FIG. 9; the upper images are the "before" photographs shown in FIG. 9 and the lower images are "after" of the sample; the right image of each upper/lower pair is an enhanced contrast version of the left image in the pair. The treatment wavelength band of light and heat at 5 minute increments were effective at eliminating the pink-stain even in the 5 minute exposure strip.

Example 3

Elimination of Pink Organic Stains Using BPO in Xylene

BPO powder, consisting of 75% benzoyl peroxide and 25% water, was added to 100% xylene. The mixture was heated to 100° F. and shaken continuously until the BPO powder was dissolved. More powder was added until a saturated solution of benzoyl peroxide in xylene was formed. The approximate concentration was 11% benzoyl peroxide, by weight. This resulted in a turbid mixture, which was then filtered through a 20 micron paper filter. The filtrate was let stand for about 20 minutes for water to settle out.

The filtration process was stopped when about 80% of the initial mixture had passed through the filter. The remainder, consisting of water, suspended water, xylene, and BPO powder and solution, was discarded. This procedure was carried out using closed vessels for mixing, then used a filter open to the air, and was at 20° C. and atmospheric pressure. The solution, once created, was held in a closed glass vessel.

A solution of benzoyl peroxide of 11% by weight was formed. This solution was clear and colorless.

A clean artist's oil paint brush of approximate ⅜" width was used to apply the solution to vinyl fabric affected by pink-staining. Once the brushed area was visibly dry, a combination heat and light source are placed directly overhead. The light source had a luminous output of about 1.8 W per square inch of light at a wavelength of 492 nm, and the temperature on the vinyl was raised to and held at 150° F. for a period of ten minutes. The application of the solution to the stained vinyl and subsequent illumination and heating were repeated three times. Fluoroscopic examination showed complete eradication of pinking at the end of this process.

Example 4

Elimination of Pink Organic Stains from Bacteria *S. Reticulum* with Increased Temperature 1) Apply a 10% (w/w) solution of BPO dissolved into xylene applied to a pink-stain on white marine vinyl.

2) The target area/stained substrate was heated to about 145° F. using a built-in heat source (max. about 150° F.).

3) Expose the pink-stained area for 10 min using 200 W (radiometric luminous energy 50 W) over an area of 25 in$^2$, which is about 2 W/in$^2$ (3,000/m$^2$), using a treatment wavelength band of 490-495 nm produced by two 100 W LED arrays, with a peak of 494 nm, ½ intensity bandwidth of 26 nm (Q-factor of 19.1).

Repeat steps 1-3 as desired to achieve removal to elimination of the pink-stain. In some embodiments, the steps are repeated 6 times.

Example 5

Autofluorescence from Pink-Stain

Figure 12:
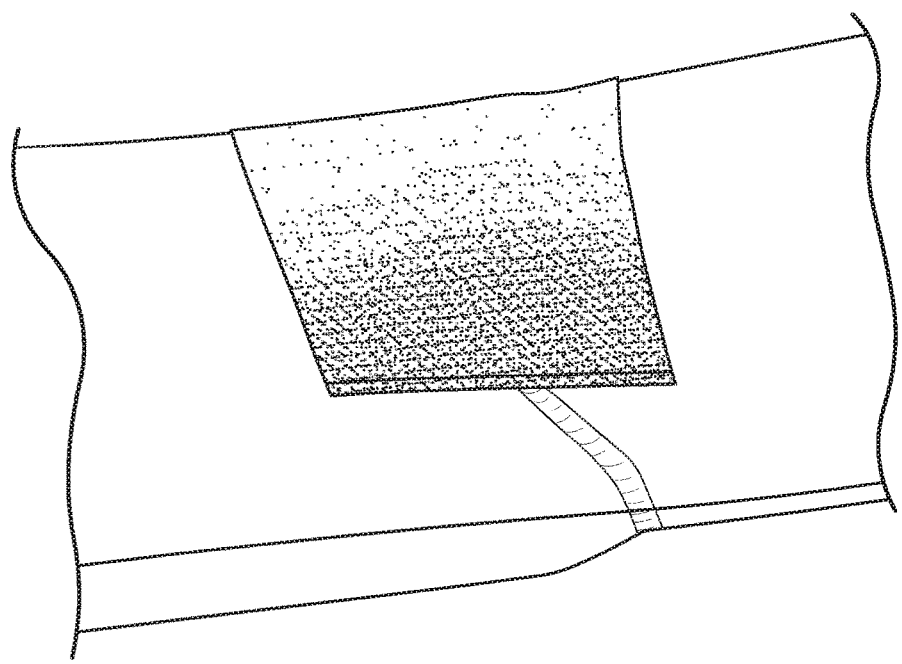
FIG. 12 depicts a photograph showing autofluorescence from pink-stain.

To detect the autofluorescence from pink-stain, a sample was subjected to excitation light under a 494 nm LED light source. A long pass filter, here a Roscolux 42 deep salmon filter, disposed between the sample and the detector substantially rejected light except for the following range: 611 nm-700 nmn (the filter starts filtering around 580 nm with 8% transmission and −3.7 stop loss. At 580 nm (yellow) transmission is 5%, and at 460% the transmission is 4%. At 600 nm the transmission is 29% and increases to about 80% for longer wavelengths). FIG. 12 depicts a photograph showing autofluorescence from pink-stain when excited as stated in this paragraph.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A method for removing a pink-stain from a substrate, the method comprising:
   a) identifying a pink-stain in a substrate wherein the pink-stain is produced from a microorganism;
   b) applying a chemically effective amount of an oxidizing agent to the pink-stain and substrate;
   c) applying a chemically effective amount of a treatment wavelength band of light to the pink-stain and substrate wherein the treatment wavelength band of light matches an absorption wavelength band of the pink-stain and wherein the treatment wavelength band of light is at least about 31 $W/m^2$;
   wherein the treatment wavelength band of light is applied to the pink-stain and substrate for a time sufficient to remove the pink-stain without substantially changing a color of the substrate.

2. The method of claim 1 wherein the method further comprises applying the chemically effective amount of the treatment wavelength band of light to eliminate the pink-stain from the substrate for a time sufficient such that the pink-stain is not visible to an unaided human eye at a surface layer of the substrate.

3. The method of claim 2 wherein the method further comprises d) applying a chemically effective amount of heat to the pink-stain, wherein the treatment wavelength band of light and heat are applied to the pink-stain and substrate for a time sufficient to remove the pink-stain without substantially changing the color of the substrate.

4. The method of claim 2 wherein treatment light applied to the pink-stain and substrate consists essentially of the treatment wavelength band of light.

5. The method of claim 2 wherein the method further comprises applying the chemically effective amount of the treatment wavelength band of light at at least about 50 $W/m^2$.

6. The method of claim 2 wherein the method further comprises applying the chemically effective amount of the treatment wavelength band of light at at least about 3,000 $W/m^2$.

7. The method of claim 2 wherein the method further comprises applying the chemically effective amount of the treatment wavelength band of light up to about 15,500 $W/m^2$.

8. The method of claim 2 wherein the method further comprises applying the chemically effective amount of the treatment wavelength band of light at at least about 5 $W/m^2/nm$.

9. The method of claim 2 wherein the oxidizing agent comprises at least one of a peroxide, benzoyl peroxide, ozone, a percarbonate, a perphosphate or hydrogen peroxide.

10. The method of claim 9 wherein the oxidizing agent consists essentially of a peroxide.

11. The method of claim 9 wherein the oxidizing agent consists essentially of benzoyl peroxide.

12. The method of claim 9 wherein the oxidizing agent consists essentially of ozone.

13. The method of claim 11 wherein the oxidizer is benzoyl peroxide or hydrogen peroxide.

14. The method of claim 13 wherein the oxidizing agent is about 25% benzoyl peroxide (w/w).

15. The method of claim 13 wherein the oxidizing agent is about 12.5% benzoyl peroxide (w/w).

16. The method of claim 13 wherein the oxidizing agent is about 11% benzoyl peroxide (w/w).

17. The method of claim 13 wherein the oxidizing agent is at least about 2% benzoyl peroxide (w/w).

18. The method of claim 2 wherein the microorganisms comprise bacteria of Actinomycetales.

19. The method of claim 2 wherein the microorganisms comprise bacteria of Streptomycetaceae.

20. The method of claim 2 wherein the microorganisms comprise *Streptoverticillium reticulum*.

21. The method of claim 2 wherein the microorganisms consist essentially of bacteria of Actinomycetales.

22. The method of claim 3 wherein the heat is at least about 120° F.

23. The method of claim 3 wherein the heat is about 200° F.

24. The method of claim 2 wherein the treatment is applied to the pink-stain and substrate for less than about 120 minutes.

25. The method of claim 2 wherein the treatment is applied to the pink-stain and substrate for less than about 10 minutes.

26. The method of claim 2 wherein the treatment is applied to the pink-stain and substrate for less than about 5 minutes.

27. The method of claim 2 wherein the treatment wavelength band of light is about 494 nm+/−5 nm applied to the pink-stain and substrate at an intensity wherein an area of about 2.25 $in^2$ (0.0015 $m^2$) receives a luminous output of at least about 2 W from a 495 nm LED, at about 120° F. for about 30 to 55 minutes.

28. The method of claim 2 wherein the method further comprises, before step b), selecting the amounts of the oxidizing agent and treatment wavelength band of light so to not exceed the operational parameters of the substrate such that steps b) and c) do not significantly alter characteristics of the substrate other than the removal of the pink-stain.

29. The method of claim 2 wherein the method further comprises, before step b), selecting the amounts of the oxidizing agent and treatment wavelength band of light so to not exceed the operational parameters of the substrate such that steps b) and c) do not significantly alter characteristics of the substrate other than elimination of the pink-stain such that the pink-stain is not visible to an unaided human eye at a surface layer of the substrate.

30. The method of claim 3 wherein the method further comprises, before step b), selecting the amounts of the oxidizing agent, the treatment wavelength band of light and the heat so to not exceed the operational parameters of the substrate such that steps b), c) and d) do not significantly alter characteristics of the substrate other than the removal of the pink-stain.

31. The method of claim 3 wherein the method further comprises, before step b), selecting the amounts of the oxidizing agent, the treatment wavelength band of light and the heat so to not exceed the operational parameters of the substrate such that steps b), c) and d) do not significantly alter characteristics of the substrate other than elimination of the pink-stain such that the pink-stain is not visible to an unaided human eye at a surface layer of the substrate.

32. The method of claim 3 wherein the method further comprises using as a heat source for the heat at least one of a hot air blower or a light source emitting the treatment wavelength band of light.

33. The method of claim 2 wherein the method further comprises transmitting the treatment wavelength band of light through a housing configured to provide even light distribution across a target area of the pink-stain and substrate.

34. The method of claim 3 wherein the method further comprises transmitting the treatment wavelength band of light and the heat through a housing configured to provide even light and heat distribution across a target area of the pink-stain and substrate.

35. The method of claim 2 wherein the substrate comprises vinyl.

36. The method of claim 2 wherein the substrate is a rice.

37. The method of claim 2 wherein the substrate is a wheat flour.

38. The method of claim 2 wherein the treatment wavelength band of light consists essentially of light from about 470 nm to 525 nm.

39. The method of claim 2 wherein the treatment wavelength band of light consists essentially of light from about 480 nm to 510 nm.

40. The method of claim 2 wherein the treatment wavelength band of light consists essentially of light at about 494 nm+/−5 nm.

41. The method of claim 2 wherein the method further comprises, before step b), identifying an absorption wavelength band of light of the pink-stain and selecting the treatment wavelength band of light to match the absorption treatment wavelength band of light.

42. The method of claim 2 wherein the oxidizing agent is carried in a solvent having a polarity of about 2 to 3, a viscosity of about 0.3 cP to 1.0 cP, and a vapor pressure of 15 to 250 mm Hg, such that a coating of the solvent applied to a marine vinyl fabric with a fine brush will fully evaporate within about 10 seconds at a temperature of 20° C.

43. The method of claim 42 wherein the solvent has a polarity of about 2.5.

44. The method of claim 43 wherein the solvent has a viscosity of about 0.7 cP to 0.9 cP.

45. The method of claim 42 wherein the solvent comprises a benzene ring.

46. The method of claim 42 wherein the solvent comprises xylene.

47. The method of claim 42 wherein the solvent comprises toluene.

48. The method of claim 42 wherein the solvent comprises methyl ethyl ketone (MEK).

* * * * *